United States Patent
Bo et al.

(10) Patent No.: US 8,253,393 B2
(45) Date of Patent: Aug. 28, 2012

(54) METHOD AND A CONTROLLING ARRANGEMENT FOR CONTROLLING AN AC GENERATOR

(75) Inventors: Yin Bo, Singapore (SG); Heng Deng, Singapore (SG); Kim B. Larsen, Hadsund (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/060,861

(22) PCT Filed: Aug. 28, 2009

(86) PCT No.: PCT/EP2009/061151
§ 371 (c)(1),
(2), (4) Date: Apr. 6, 2011

(87) PCT Pub. No.: WO2010/023285
PCT Pub. Date: Mar. 4, 2010

(65) Prior Publication Data
US 2011/0175354 A1 Jul. 21, 2011

Related U.S. Application Data

(60) Provisional application No. 61/230,116, filed on Jul. 31, 2009, provisional application No. 61/093,876, filed on Sep. 3, 2008.

(30) Foreign Application Priority Data

Aug. 29, 2008 (DK) .............................. PA 2008 01203
Jul. 30, 2009 (DK) .............................. PA 2009 70075

(51) Int. Cl.
*H02P 9/00* (2006.01)
*H02P 9/04* (2006.01)

(52) U.S. Cl. ............................................. 322/44; 290/44
(58) Field of Classification Search .................... 290/44, 290/55; 700/288, 287, 290; 322/44, 89, 322/24; 307/31
See application file for complete search history.

(56) References Cited

U.S. PATENT DOCUMENTS 5,083,039 A * 1/1992 Richardson et al. ............ 290/44
(Continued)

FOREIGN PATENT DOCUMENTS
CN 101141110 A * 3/2008
(Continued)

OTHER PUBLICATIONS

Hu Jiabing. English machine translation of document CN 101141110 A. Mar. 2008.*

(Continued)

*Primary Examiner* — Julio Gonzalez R.
(74) *Attorney, Agent, or Firm* — Wood, Herron & Evans, LLP (57) ABSTRACT

The present disclosure related to a method and a controller for controlling an AC generator which is used in connection with a wind turbine having a variable speed. The multi-phase generator is connected to a controllable converter and is controlled to provide a desired power or a desired torque. An AC reference signal is generated, which would provide the desired power or torque. A P+Resonant converter may be used to control an electrical characteristic of the generator in view of the reference, by applying control signals to the controllable converter. Thereby, the need to transform the electrical characteristic into a rotating frame may be eliminated which provides for a less complex controller.

17 Claims, 8 Drawing Sheets

U.S. PATENT DOCUMENTS

| | | | | |
|---|---|---|---|---|
| 5,652,485 | A * | 7/1997 | Spiegel et al. | 318/147 |
| 7,095,131 | B2 * | 8/2006 | Mikhail et al. | 290/44 |
| 7,511,385 | B2 * | 3/2009 | Jones et al. | 290/43 |
| 7,554,302 | B2 * | 6/2009 | Schauder | 322/44 |
| 2002/0070713 | A1 * | 6/2002 | Stefanovic et al. | 322/24 |
| 2007/0278797 | A1 * | 12/2007 | Flannery et al. | 290/44 |
| 2010/0327585 | A1 * | 12/2010 | Cao et al. | 290/44 |

FOREIGN PATENT DOCUMENTS

| | | |
|---|---|---|
| CN | 101141111 A | 3/2008 |
| JP | 2005278224 A | 10/2005 |
| WO | 2007054729 A1 | 5/2007 |

OTHER PUBLICATIONS

Denmark Patent Office, Search Report issued in related Denmark Application No. PA 2009 70075 dated Feb. 24, 2010.

Denmark Patent Office, Search Report issued in related Denmark Application No. PA 2008 01203 dated Mar. 24, 2009.

Blaabjerg et al., "Overview of Control and Grid Synchronization for Distributed Power Generation Systems", IEEE Transactions on Industrial Electronics, IEEE Service Center, Piscataway, NJ, vol. 53, No. 5, Oct. 1, 2006, pp. 1398-1409.

Xu et al., "Dynamic modeling and control of DGIF-based wind turbines under unbalanced network conditions", IEEE Transactions on Power Systems, vol. 22, No. 1, Feb. 2007, pp. 314-323.

European Patent Office, International Search Report issued in related International application No. PCT-E2009/061151 dated Feb. 3, 2010.

European Patent Office, Written Opinon issued in related International application No. PCT-E2009/061151 dated Mar. 4, 2010.

* cited by examiner

METHOD AND A CONTROLLING ARRANGEMENT FOR CONTROLLING AN AC GENERATOR

TECHNICAL FIELD

The present invention relates to a method for controlling a multi-phase alternating current (AC) generator which is connected to a controllable converter, the generator having a rotor with a shaft connected to at least one wind turbine blade. The invention further relates to a controlling arrangement suitable for carrying out the method.

BACKGROUND

Such a method is disclosed in U.S. Pat. No. 5,083,039, which describes an AC induction generator connected to a power converter. The torque of the generator is controlled using a PI regulator operating utilising field orientation. The power converter is then controlled to provide stator currents which result in the desired torque. This enables the controller to fully eliminate an error in a stationary state. One drawback with such a system however, is that it will be relatively complex.

SUMMARY

An object of the present disclosure is to wholly or partly obviate the above mentioned problem, and more particularly to provide a method and an apparatus for controlling an AC generator which is less complex.

This object is achieved by a method as defined in claim 1 or a corresponding controlling arrangement carrying out the method as defined in claim 11.

More specifically, the method comprises determining the rotational speed and phase of a rotor flux generated by the rotor of the generator, determining an electrical characteristic of the AC generator, generating an AC reference signal based on the phase of the rotor flux, determining an error signal representing the difference between the electrical characteristic of the AC generator and the AC reference signal, applying the error signal to a controller to generate a reference voltage, wherein the controller has a feedback function and a resonant function with a variable resonance frequency set to correspond to the frequency of the stator flux reference, and applying the reference voltage to the controllable converter.

The use of a controller with resonant properties means that the stator currents as well as stator flux may be controlled as alternating signals. Therefore there is no need to transform the currents or stator flux to be controlled into a rotating frame, which provides for a less complex controller. As the resonance frequency varies in accordance with the reference signal and consequently in accordance with the rotation of the wind turbine, the controller is capable of controlling the converter correctly even though the wind speed varies.

The AC reference signal may be generated based on an error signal corresponding to a difference between a desired power and an actual power. As an alternative however, the AC reference signal may be generated based on an error signal corresponding to a difference between a desired torque and an actual torque.

The AC reference signal may be an AC current reference or an AC stator flux reference and the electrical characteristic which is determined may be an AC current signal or an AC stator flux estimate.

The controller may be a P+resonant controller comprising a proportional coefficient, $K_P$, and a resonant coefficient, $K_I$, wherein $K_P$ and $K_I$ are constants or alternatively are varied depending on the rotational speed of the rotor flux. In any case however, the resonance frequency $\omega_{re}$ of the controller is varied in accordance with the rotor speed.

Additionally, the reference voltage may compensate for the generator electromagnetic force, EMF. This provides an even more efficient control.

The controlling arrangement is devised in accordance with the method. In an aspect of the invention, there is provided a controlling arrangement for a multi-phase alternating current (AC) generator, comprising a rotor connected to at least one wind turbine blade, which is connected to a controllable converter, the arrangement comprising a first detector device for detecting a rotational speed of a rotor flux generated by the rotor, a sensor block for determining an electrical characteristic of the AC generator, a reference generator for generating an AC reference signal based on a phase of the rotor flux, the phase of the rotor flux being determined based on the rotational speed, an error signal generator for determining an error signal representing the difference between the electrical characteristic and the AC reference signal, and a controller adapted to generate a reference voltage based on the error signal, wherein the controller has a feedback function and a resonant function with a variable resonance frequency set to correspond to the frequency of the stator flux reference, wherein the reference voltage is adapted to control the controllable converter.

DETAILED DESCRIPTION

Figure 1:
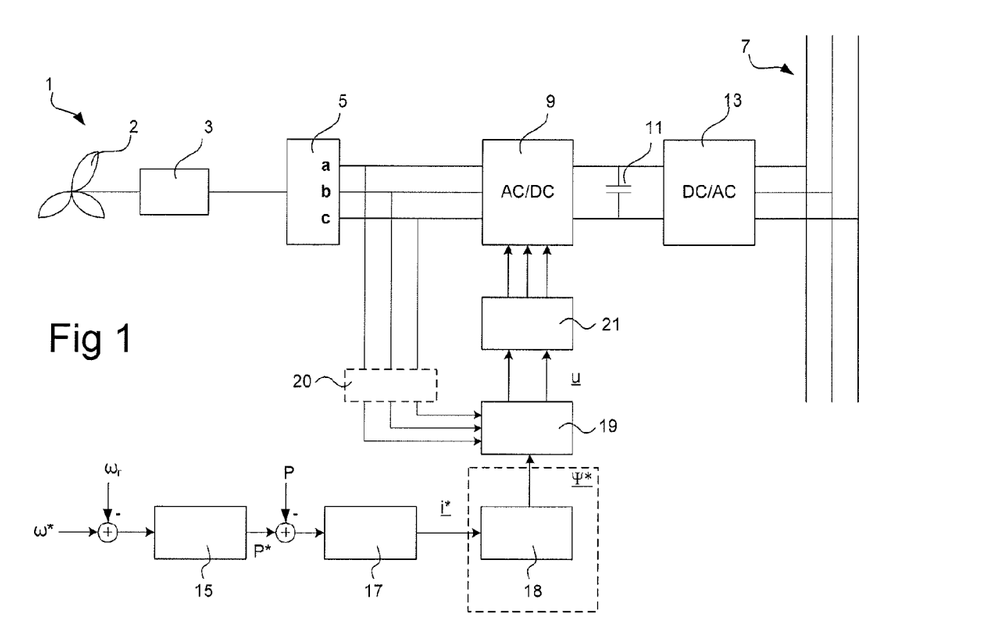
FIG. 1 illustrates schematically a context in which a controlling method of the present disclosure may be applied.

FIG. 1 illustrates schematically a context in which a controlling method or device of the present disclosure may be applied. A wind turbine 1 with at least one blade 2, in rotary motion, is connected via an optional gearbox 3, which is used to increase the rotating speed of the motion, to a wind turbine generator (WTG) 5, which converts the rotary motion into electric power.

The WTG 5 is intended to supply power to a fixed-frequency (typically 50 or 60 Hz) power grid 7. Even if it is possible to run a WTG in synchronism with such a power grid, e.g. by controlling the pitch of the blade 2, it is much preferred to allow the wind turbine blade 2 rotary speed to vary within a certain range. This provides a higher energy efficiency, as the wind turbine blade may for instance be allowed to rotate with an optimum speed for any given wind speed. Additionally, other considerations may be made for an overall improved performance. For instance, the mechanical stress which parts of the wind turbine is subjected to may be decreased, such that maintenance costs may be kept low.

Therefore, the WTG 5 is allowed to produce alternating current (AC) power out of synchronism with the power grid 7. An AC/DC converter 9 is connected to the stator windings of the WTG 5 and converts its output AC power to direct current (DC) power. The AC/DC converter 9 is connected via a filter capacitor 11 to a DC/AC converter 13, which converts the direct current (DC) power to AC power in synchronism with the power grid 7. A transformer (not shown) may be placed between the DC/AC converter 13 and the grid 7.

In a typical example, it is desired to run the wind turbine 1 at a specific desired rotational speed ω* for a given wind velocity. Control may then be achieved in three cascaded loops.

Firstly, the actual rotational speed w is subtracted from the desired rotational speed ω* to provide a speed error signal. This speed error signal is fed to a speed controller 15, which in response outputs a desired power signal P*. Secondly, the actual power P is subtracted from the desired power P* to provide a power error signal. The power error signal is fed to a power controller 17, which in response outputs a desired amplitude of the stator power generation current signal i*.

Figure 4:
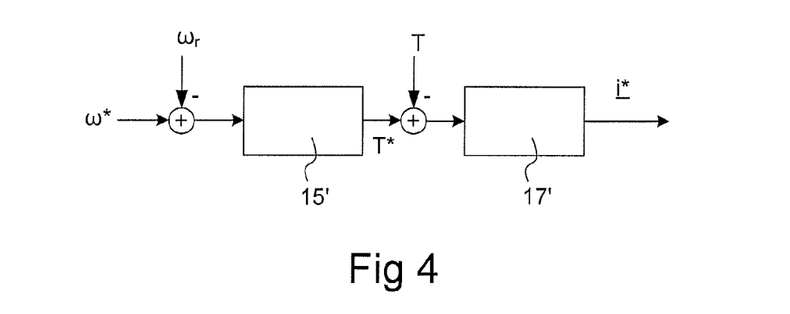
FIG. 4 illustrates an outer loop regulating the turbine speed based on the generator power.

As an alternative to using the power as a control parameter, torque could instead be used as illustrated in FIG. 4. The speed controller 15' then outputs a desired torque speed T* which is compared with the actual torque to provide a torque error signal which is fed to a power controller 17'. As a response, the power controller 17' outputs a desired amplitude of the stator power generation current signal i*.

Power and torque of a WTG are related by the angular velocity (i.e. the rotational speed of the rotor) according to:

$$P = \omega_{rotor} \cdot T$$

This implies that torque and power control exhibit different characteristics when applied to a WTG. More specifically, when controlling the torque of a WTG, it is necessary to include the rotor speed in the control loop. Power control is hence superior to torque control when the signal to be controlled is power since the transient response is different for the two control methods, i.e. when using torque control, a change in power would require both the rotor speed and the torque to settle before proper control may be applied.

Thirdly, returning to FIG. 1, a controller 19 outputs a stator voltage signal u in response to at least a reference signal and an electrical characteristic of the WTG 5. In an embodiment of the invention, the stator voltage signal u is output in response to the desired stator current signals i* and the actual stator current signals i ($i_a$, $i_b$, $i_c$).

In an alternative embodiment of the invention, there is present a stator flux reference generator 18 to output a stator flux reference Ψ* based on the desired stator current signal i*. The controller 19 thereafter outputs a stator voltage signal u in response to at least the stator flux reference signal Ψ* and an estimated stator flux. A flux estimator 20 determines the estimated stator flux, in this present embodiment, from, for example, actual stator current signals ($i_a$, $i_b$, $i_c$) of the wind turbine generator 5. In all embodiments, the stator voltage signal u is fed to a PWM modulator 21 which controls the AC/DC converter 9 accordingly.

The present disclosure relates to the third of these control loops, i.e. the innermost loop regulating the stator currents or stator flux. It should be understood that the functions of the outer loops can be achieved in other ways that will not be discussed further. One example, however, would be to provide a lookup table that, in response to a given wind flow or blade speed, provides a desired stator current.

Further, the operation of the DC/AC converter 13 is not discussed further as its operation is well known.

Figure 2:
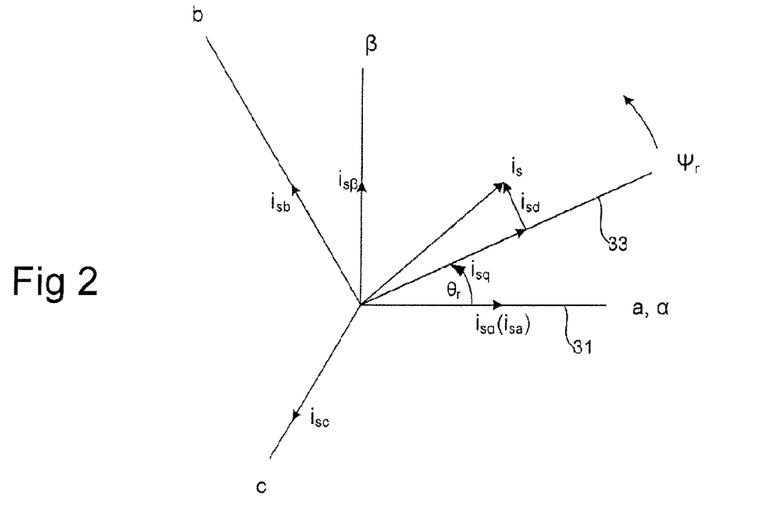
FIG. 2 illustrates current vectors in a permanent magnet synchronous generator (PMSG).

With reference to FIG. 2, the following example will be given based on a wind turbine 1 comprising a permanent magnetic synchronous generator (PMSG). With some modifications, to be explained later, the concept of the present description is however applicable to a synchronous generator with a rotor coil or an asynchronous generator, e.g. a squirrel case rotor generator.

With reference to FIG. 2, the voltages for the three terminals a-b-c of a three-phase generator are given by the expression:

$$\begin{bmatrix} u_{sa} \\ u_{sb} \\ u_{sc} \end{bmatrix} = R_s \cdot \begin{bmatrix} i_{sa} \\ i_{sb} \\ i_{sc} \end{bmatrix} + L_m \begin{bmatrix} 1+\sigma & -0.5 & -0.5 \\ -0.5 & 1+\sigma & -0.5 \\ -0.5 & -0.5 & 1+\sigma \end{bmatrix} \frac{d}{dt} \begin{bmatrix} i_{sa} \\ i_{sb} \\ i_{sc} \end{bmatrix} + \begin{bmatrix} E_{sa} \\ E_{sb} \\ E_{sc} \end{bmatrix} \quad \text{(Eq. 1)}$$

where $E_{sa}$, $E_{sb}$, and $E_{sc}$ denote the generator EMF for each phase, $L_m$ is the mutual inductance of the phase windings, σ is the leakage factor, i.e. the self inductance divided with the mutual inductance, and $R_s$ is the winding resistance.

Using the relationship ($i_{sa}+i_{sb}+i_{sc}=0$), the voltages for the three terminals a-b-c of a three-phase generator can be simplified to:

$$u_{sa} = R_s \cdot i_{sa} + (1.5+\sigma)L_m \frac{di_{sa}}{dt} + E_{sa} \quad \text{(Eq. 2)}$$

$$u_{sb} = R_s \cdot i_{sb} + (1.5+\sigma)L_m \frac{di_{sb}}{dt} + E_{sb}$$

$$u_{sc} = R_s \cdot i_{sc} + (1.5+\sigma)L_m \frac{di_{sc}}{dt} + E_{sc}$$

The EMF for each phase is:

$$E_{sa} = -\omega_r \Psi_m \cos(\theta_r) \quad \text{(Eq. 3)}$$

$$E_{sb} = -\omega_r \Psi_m \cos\left(\theta_r - \frac{2\pi}{3}\right)$$

$$E_{sc} = -\omega_r \Psi_m \cos\left(\theta_r - \frac{4\pi}{3}\right),$$

respectively, where $\omega_r$ denotes the rotor flux angular velocity, $\theta_r$ is related to the rotor flux angle, and $\psi_m$ is the amount of magnetic flux generated by the rotor.

The torque and power are given by the expressions:

$$T_{em} = -p\Psi_m \left[ i_{sa}\cos\theta_r + i_{sb}\cos\left(\theta_r - \frac{2\pi}{3}\right) + i_{sc}\cos\left(\theta_r - \frac{4\pi}{3}\right) \right] \quad \text{(Eq. 4)}$$

$$P_{em} = \omega_M \cdot T_{em}, \quad \text{(Eq. 5)}$$

where $\omega_M = \omega_r/p$ and p is the number of pole pairs of the rotor. It is thus possible to control the PMSG power in a wind turbine setup by controlling each of the winding currents.

This can be done by controlling the phase voltages with the switches of the AC/DC converter. It is however only the stator current component that is perpendicular to the rotor flux that contributes to the torque, and hence, power.

In U.S. Pat. No. 5,083,039, which accomplishes a control method for a three phase squirrel-cage rotor generator, there is first carried out a transformation from a three-phase (a-b-c) system to an equivalent two-phase (α-β) system:

$$i_{s\alpha} = \frac{2}{3}\left(i_{sa} + i_{sb}\cos\left(\frac{2\pi}{3}\right) + i_{sc}\cos\left(\frac{4\pi}{3}\right)\right) \quad \text{(Eq. 6)}$$

$$i_{s\beta} = \frac{2}{3}\left(i_{sb}\sin\left(\frac{2\pi}{3}\right) + i_{sc}\sin\left(\frac{4\pi}{3}\right)\right)$$

This three-to-two phase transformation is well known. Further, a second transformation is carried out which maps the two phase currents on a rotating coordinate system, in which the quadrature axis q coincides with the rotor flux and the direct axis d is perpendicular thereto:

$$i_{sd} = i_{s\alpha}\cos\theta_r + i_{s\beta}\sin\theta_r$$

$$i_{sq} = -i_{s\alpha}\sin\theta_r + i_{s\beta}\cos\theta_r \quad \text{(Eq. 7)}$$

Note that $\theta_r$ relates to the angle of the rotor flux. In a rotor for a squirrel cage induction generator, the flux slips in relation to the rotor. This is however not the case in a synchronous generator such as a PMSG.

The above transformations can also be similarly applied onto the phase voltages in a three-phase (a-b-c) system to an equivalent two-phase (α-β) system and then subsequently into the d-q rotating coordinate system.

FIG. 2 illustrates schematically the currents described so far. The three phases a, b and c are separated from one another by 120° and the phase a may be designated as the stationary stator axis 31. The instantaneous stator current $i_s$ is the sum of the three phase currents $i_{sa}$, $i_{sb}$, $i_{sc}$, the positive directions of which are indicated in the drawing. At the illustrated instant, $i_{sc}$ has a negative value. In the α-β frame, which is stationary as well, the stator currents may instead be defined with the two currents $i_{s\alpha}$ and $i_{s\beta}$. There is thus defined α-β axis in which the α axis is the stator axis 31 and the β axis is perpendicular to the stator axis 31. The rotor flux $\psi_r$ rotates in relation to the stator axis 31. All currents illustrated so far vary periodically, usually with a sinusoidal function having a frequency that is equal to the rotating speed of the rotor flux (or higher in case of a rotor with more than two poles).

The second transformation however results in two currents which are constant when the generator is in a stationary state, as they are defined in a rotating frame. The current $i_{sd}$, which may be called a power generating current, is perpendicular to the rotor flux, and the current $i_{sq}$, which may be called a flux generating current, is parallel with the rotor flux.

The current $i_{sd}$, which is perpendicular to the rotor flux, may be controlled as a DC parameter as long as the generator is in a stationary state. This may be done since the power is proportional to $i_{sd}$. In U.S. Pat. No. 5,083,039 this current is controlled in relation to a DC reference using a PI controller, which is capable of completely eliminating an error for a DC signal. The output of the DC controller is connected to a controllable rectifier which ensures that the voltage at each phase corresponds to a value resulting in the desired stator currents. While this approach may be appropriate in most applications, its realisation may be quite complex and require expensive control equipment. In the following there is therefore described a control method and apparatus which may be realised as a less complex system. In particular there is described, a control method/apparatus where a transformation into a rotating frame is not necessary.

The control concept of the present disclosure uses a resonant controller together with a feedback controller and, optionally, a feed-forward controller. The combination of a resonant controller and a feedback controller may typically be a P+Resonant controller which is well known per se. Other possibilities include combinations with feedback PI controllers, and sliding mode controllers, etc.

Figure 3A:
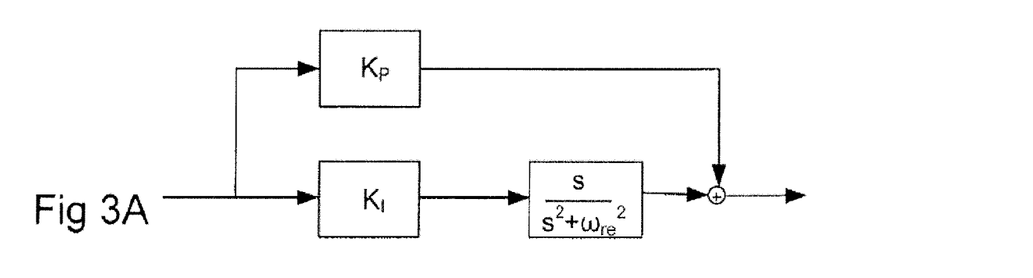
FIG. 3A illustrates schematically a P+Resonant controller.
Figure 3B:
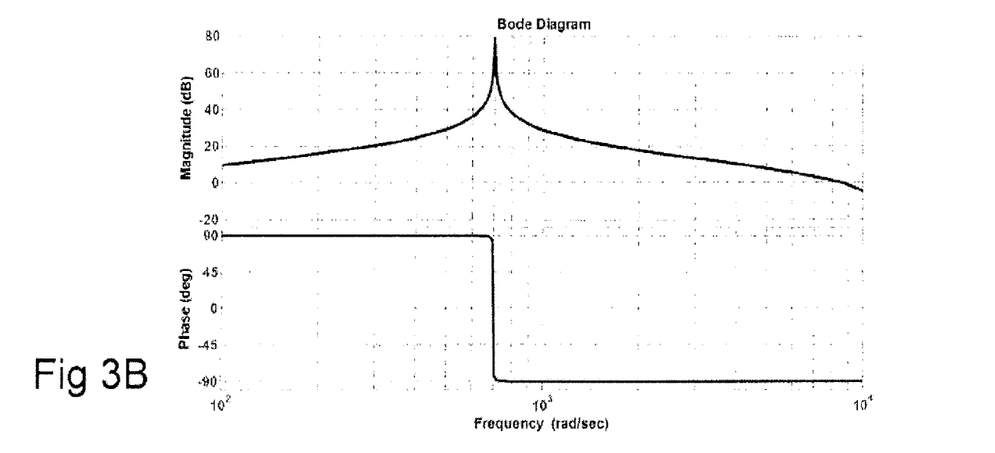
FIG. 3B shows a Bode plot of a P+Resonant controller.

Generally, a P+Resonant controller, which is used as an example here, may be presented as illustrated schematically in FIG. 3A. A Bode plot for the controller is illustrated in FIG. 3B. The controller has a proportional portion and a resonant portion. The resonant portion contributes to the output only for frequencies in the vicinity of a centre frequency $\omega_{re}$, which in the present disclosure is set to correspond to the rotating speed of the rotor flux, which may for example be obtained by way of an encoder to measure the mechanical characteristics of a rotor on an electrical generator. It is of note that the frequency of the stator flux and the frequency of the rotor flux are equal, and that the frequency of the stator flux reference is naturally equal to that of the frequency of the stator flux. Note that the parameter $\omega$, refers to the angular velocity of the rotor flux. The transfer function of an ideal P+Resonant controller may be defined as follows:

$$H(s) = K_P + K_I \frac{s}{s^2 + \omega_{re}^2} \quad \text{(Eq. 8)}$$

This regulator has the capability of completely eliminating an error also in an alternating parameter as long as the parameter alternates with a frequency close to $\omega_{re}$. Therefore, the need for performing the transformation into a rotary frame may be eliminated. Instead, control may be applied directly on a three phase current or a two-phase transformation thereof. At the same time the parameter $\omega_{re}$ is fed to the controller. $K_p$ and $K_I$ may be constants or may be varied in accordance with the rotor speed to achieve different dynamic properties.

There are several possible implementations of the above P+Resonant control. P+Resonant controller may be implemented by using the following transfer function to achieve practical resonant peak at a certain range of frequencies.

$$H_{ac}(s) = K_P + \frac{2K_I\omega_c s}{s^2 + 2\omega_c s + \omega_{re}^2} \quad \text{(Eq. 9)}$$

where $\omega_{re}$ denotes the resonance frequency and $\omega_c$ can be regarded as a damping factor at the resonant peak.

Figure 5:
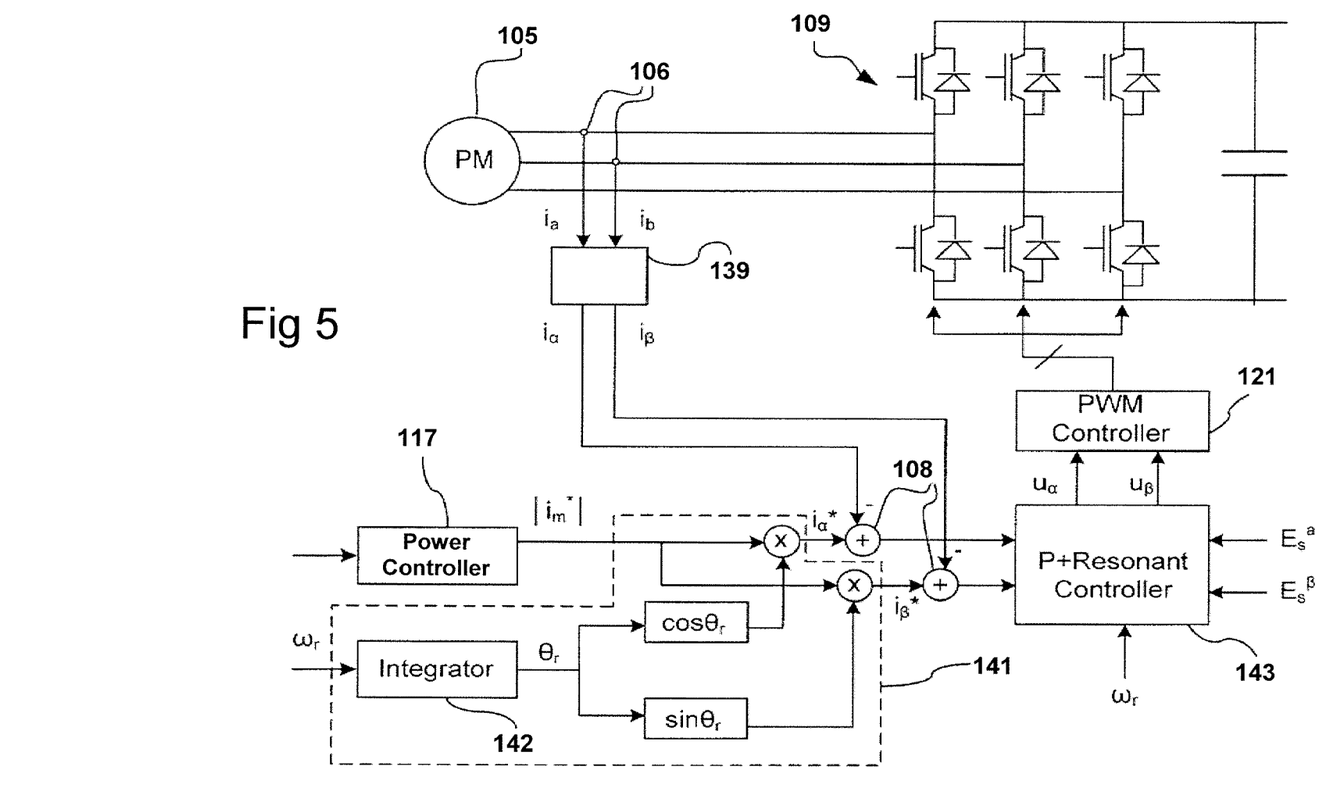
FIG. 5 illustrates a control device according to one embodiment of the invention.

FIG. 5 illustrates a control apparatus utilizing a P+Resonant controller according to an embodiment of the invention. A three phase PMSG 105 is connected to a controllable AC/DC converter/rectifier 109 comprising six switches. Two of the stator currents $i_a$, $i_b$ are measured, using sensors 106, to generate two sensor signals. There is usually no need to measure the third phase current $i_c$ as, typically, each current at all instants has a predetermined relationship to the other two. The current signals are transformed into the α-β frame by means of an α-β transformation unit 139, which applies the function of eq. 6 above, thereby providing the currents $i_\alpha$, $i_\beta$. As will be shown later, it is however also possible to let the controller operate directly on the stator currents, i.e. in the a-b-c or natural frame.

As in the system described in connection with FIGS. 1 and 4, a power (or torque) controller 117 outputs a reference value $i_m^*$, which corresponds to a torque generating current that provides the desired torque. A current reference block 141 generates, based on $i_m^*$, current reference values in the α-β frame, i.e. $i_\alpha^*$, $i_\beta^*$.

The current reference block 141 comprises an integrator 142 which provides, based on the rotation speed $\omega_r$, an estimate of the rotor flux angle $\theta_r$ in relation to the stator axis (cf. 31, FIG. 2). This is done by integrating the rotor speed and providing the result modulo $2\pi$. The current reference values in the α-β frame $i_\alpha^*$, $i_\beta^*$ are then provided as:

$$i_\alpha^* = i_m^* \cos\theta_r$$

$$i_\beta^* = i_m^* \sin\theta_r \quad\quad (Eq. 10)$$

For each of the current reference values, an error signal is then provided simply by subtracting the actual value using summing units 108. Each of the error signals are then fed to a P+Resonant controller in a controller block 143, which accordingly provides control signals $u_\alpha$, $u_\beta$ to a PWM controller 21. The controller block 143 also receives a measure $\omega_r$ of the rotor speed.

Figure 6:
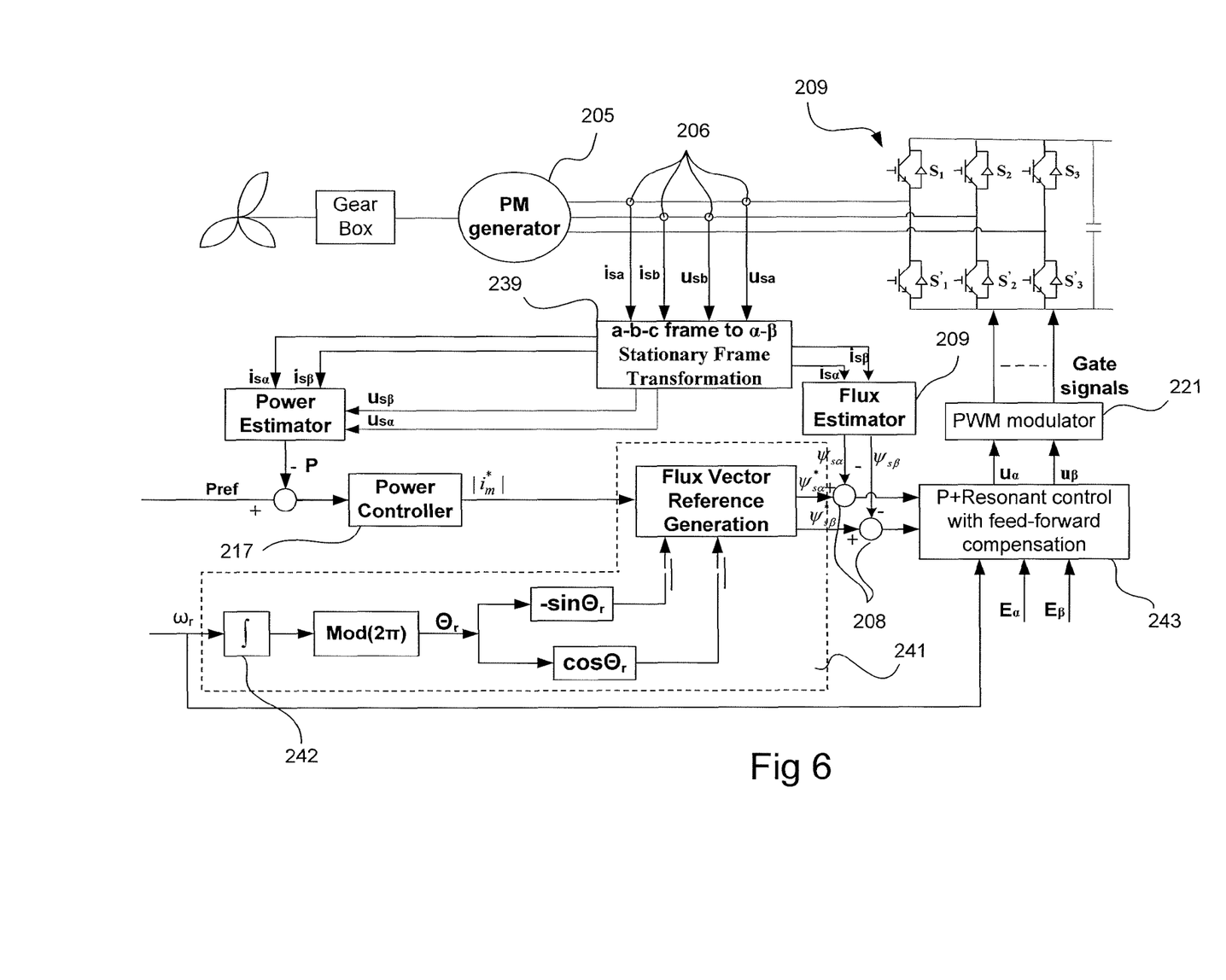
FIG. 6 illustrates a control device according to another embodiment of the invention.

FIG. 6 illustrates a control apparatus according to another embodiment of the invention. A three phase PMSG 205 is connected to a controllable AC/DC converter/rectifier 209 comprising six switches. Two of the stator currents $i_a$, $i_b$, and two of the stator voltages $u_a$ and $u_b$, are measured, using sensors 206, to generate current and voltage sensor signals. There is usually no need to measure the third phase current $i_c$ or voltage $u_c$ as, typically, each line current or voltage at all instants has a predetermined relationship to the other two. The current and voltage signals are transformed into the α-β frame by means of an α-β transformation unit 239, which applies the function of eq. 6 above, thereby providing the currents $i_\alpha$, $i_\beta$, and voltages $u_\alpha$, $u_\alpha$.

The currents $i_\alpha$, $i_\beta$ are then passed into a flux estimator 220 to obtain an estimation of the stator flux. There are many ways to achieve stator flux in the stationary frame, for example open-loop flux estimation or closed-loop flux observer. One possible stator flux estimator is based on a current model. This is provided as:

$$\psi_{s\alpha} = L_s i_{s\alpha} + \psi_m \cos\theta_r$$

$$\psi_{s\beta} = L_s i_{s\beta} + \psi_m \sin\theta_r \quad\quad (Eq. 11)$$

$$\text{where stator inductance } L_s = \left(\frac{3}{2} + \sigma\right) L_m$$

and $\Psi_m$ refers to rotor flux, which is a constant parameter in a PMSG, and is built up to a constant value prior to startup for an asynchronous machine (AM), and which is used for controlling stator flux in the AM.

Alternatively, the stator flux estimate may simply be obtained from measurements on the electrical generator, for example by means of an encoder, which obtains the angular speed of the rotor position of the generator, which is thereafter combined with measured stator voltages of the wind turbine generator 205, to obtain a stator flux estimation. The stator flux estimate could also be obtained by direct measurement with an inductive sensor.

It may as such be described that there is provided a sensor block 246 for determining an electrical characteristic of the AC generator, the electrical characteristic being an AC current or AC stator flux. The sensor block could for example comprise simply of a sensor such as sensor 106 as described in FIG. 5, to provide a measurement of two stator currents of the generator 105. Alternatively, all three stator currents of the generator could be measured. In order to determine AC stator flux, the sensor block 246 could comprise of current or voltage sensors 206, a α-β transformation unit 239, as well as a flux estimator 220. The sensor block 246 could alternatively comprise of a system to take in encoder inputs and measured stator voltages to determine AC stator flux. In another embodiment, the sensor block 246 could also be an inductive sensor for direct measurement of the AC stator flux.

Returning to FIG. 6, power (or torque) controller 217 outputs a reference value $i_m^*$, which corresponds to a power generating current that provides the desired power. The stator flux reference values in the α-β stationary frame of a PMSG $\psi_\alpha^*$, $\psi_\beta^*$ are generated in a stator flux reference generator block 241 by using the amplitude of the stator current and the rotor angle:

$$\psi_{sqref} = L_{sq} I_{sq} + \psi_m$$

$$\psi_{sdref} = -L_{sd} i_m^* \quad\quad (Eq. 12)$$

where $\psi_{sqref}$, $\psi_{\beta dref}$ are the stator flux reference values in the d-q rotating frame, $L_{sd}$ and $L_{sq}$ are the inductances of the stator in the d-q frame. It may be noted that in surface-mounted permanent magnet (SMPM) generators, the $I_{sq}$ term may be set to 0, as $i_{sq}$ is a reference for flux build up, leading to the stator flux reference in the q-frame $\psi_{sqref}$ being simply a function of machine flux $\Psi_m$.

The stator flux reference generator block 241 also comprises an integrator 242 which provides, based on the rotational speed $\omega_r$, an estimate of the rotor flux angle $\theta_r$ in relation to the stator axis. This is similarly done by integrating the rotor speed and providing the result modulo $2\pi$.

A further transformation from the stator flux reference values in the d-q rotating frame to the α-β stationary frame is then performed, with consideration to the rotor flux angle $\theta_r$ to obtain the stator flux reference values in the α-β stationary frame:

$$\begin{bmatrix} \psi_{s\alpha}^* \\ \psi_{s\beta}^* \end{bmatrix} = \begin{bmatrix} \sin\theta_r & \cos\theta_r \\ -\cos\theta_r & \sin\theta_r \end{bmatrix} \begin{bmatrix} \psi_{sdref} \\ \psi_{sqref} \end{bmatrix} \quad\quad (Eq. 13)$$

For each of the stator flux reference values, an error signal is then provided simply by subtracting the estimated flux value using summing units 208. Each of the error signals are then fed to a P+Resonant controller in a controller block 243, which accordingly provides control signals $u_\alpha$, $u_\beta$ to a PWM controller 221. The controller block 243 also receives a measure $\omega_r$ of the rotor speed.

The PWM controller (which are the same for the above-described embodiments) operates in a manner well known to the skilled person and will not be described in greater detail. The PWM controller 121 (or 221) controls the switches of the AC/DC converter 109 (or 209), one pair of switches for each phase, which are controlled in a complementary fashion for instance according to a space vector pulse width modulation, SVPWM, scheme, as is well known. The switching frequency of the AC/DC converter is much higher than the generator frequency, such that it may be ensured that the correct instantaneous voltage is produced at each phase of the PMSG at all times. The switching frequency may be fixed or may vary in accordance with the variations of the AC generator current frequency.

Figure 7:
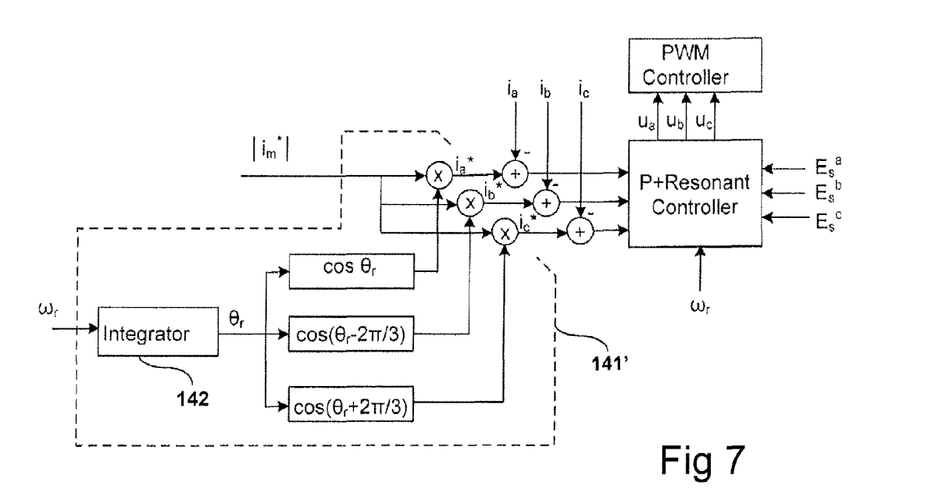
FIG. 7 illustrates a control device according to an embodiment where currents in the natural frame are controlled.

FIG. 7 illustrates a case where the controller operates in the a-b-c or natural frame according to an embodiment of the invention. That is, the stator currents are controlled directly, instead of after being transformed into the α,β-frame. The advantage of this configuration is that one transformation step can be dispensed with. On the other hand, three reference currents need be generated and three currents need be controlled. However, in some embodiments the control concept that will now be described in connection with FIG. 7 may still be more efficient in terms of controller complexity.

A slightly modified current reference block 141' comprises an integrator 142 as previously described in connection with FIG. 5. The reference current values in the natural frame $i_a^*$, $i_b^*$, $i_c^*$ are provided as $$i_a^* = i_m^* \cos\theta_r$$

$$i_b^* = i_m^* \cos\left(\theta_r - \frac{2\pi}{3}\right)$$

$$i_c^* = i_m^* \cos\left(\theta_r + \frac{2\pi}{3}\right)$$

(Eq. 14)

Thereby, three reference current values which are 120° out of phase with each other are provided. For each of the reference current values an error signal is then provided simply by subtracting the actual current value. Each of the error signals are then fed to a P+Resonant controller 143, which accordingly provides control signals $u_a$, $u_b$, $u_c$ to a PWM controller 121. The PWM controller then operates in a manner well known per se, providing control signals to the switches of the converter 9 of FIG. 1. Feedforward compensation of EMF may also be included as illustrated.

The actual rotation speed ω of the rotor may be determined by means of, for example, an inductive sensor as is well known per se in the art, or by use of sensorless technology.

It may be expedient to determine the actual power value based on the stator currents as follows in the α-β frame or in the natural frame:

$$P_{em} = p\frac{d}{dt}\Psi_s^T \cdot i_s$$

(Eq. 15)

where p denotes the number of rotor poles, vector $\psi_s$ denotes a stator flux vector with $\psi_s = [\psi_{sa}\ \psi_{sb}\ \psi_{sc}]$ (or $\psi_s = [\psi_{s\alpha}\ \psi_{s\beta}]$) and vector $i_s$ denotes the three phase current $i_s = [i_{sa}\ i_{sb}\ i_{sc}]$ (or $i_s = [i_{s\alpha}\ i_{s\beta}]$).

The actual torque T may be determined by using sensors as well. It can also determined as:

$$T_{em} = P_{em}/\omega_M$$

(Eq. 17)

where $\omega_M = \omega_r/p$.

Figure 8:
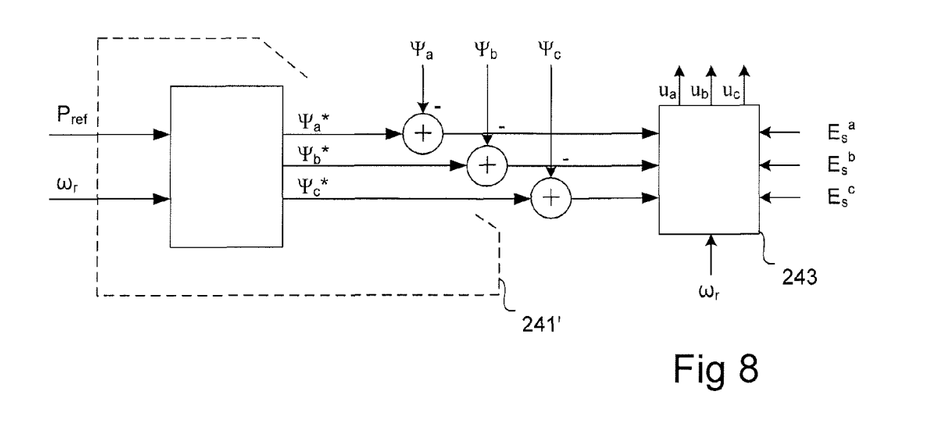
FIG. 8 illustrates a control device where currents in the natural frame are controlled according to another embodiment

FIG. 8 illustrates a case where the controller operates in the a-b-c or natural frame according to another embodiment.

A slightly modified stator flux reference generation block 241', in comparison with the embodiment illustrated in FIG. 6, comprises an integrator, torque or power controller and stator flux reference generation block as previously described. The stator flux reference values are first obtained in the d-q frame, before being transformed to the α-β stationary frame, then to the natural frame. $\psi_{sa}^*$, $\psi_{sb}^*$, $\psi_{sc}^*$ are provided as:

$$\begin{bmatrix} \psi_{sa}^* \\ \psi_{sb}^* \\ \psi_{sc}^* \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \psi_{s\alpha}^* \\ \psi_{s\beta}^* \end{bmatrix}$$

(Eq. 18)

Similarly, three stator flux reference values which are 120° out of phase with each other are provided. For each of the stator flux reference values an error signal is then provided simply by subtracting the corresponding estimated value determined by a flux estimator 220. Each of the error signals are then fed to a P+Resonant controller 243, which accordingly provides control signals $u_a$, $u_b$, $u_c$ to a PWM controller 21 (not shown in FIG. 8). The PWM controller then provides control signals to the switches of the converter. Feedforward compensation of EMF may also be included as illustrated.

The controllers as described above may readily be adapted to a synchronous machine with more than two poles in ways well known to the skilled person.

Figure 9:
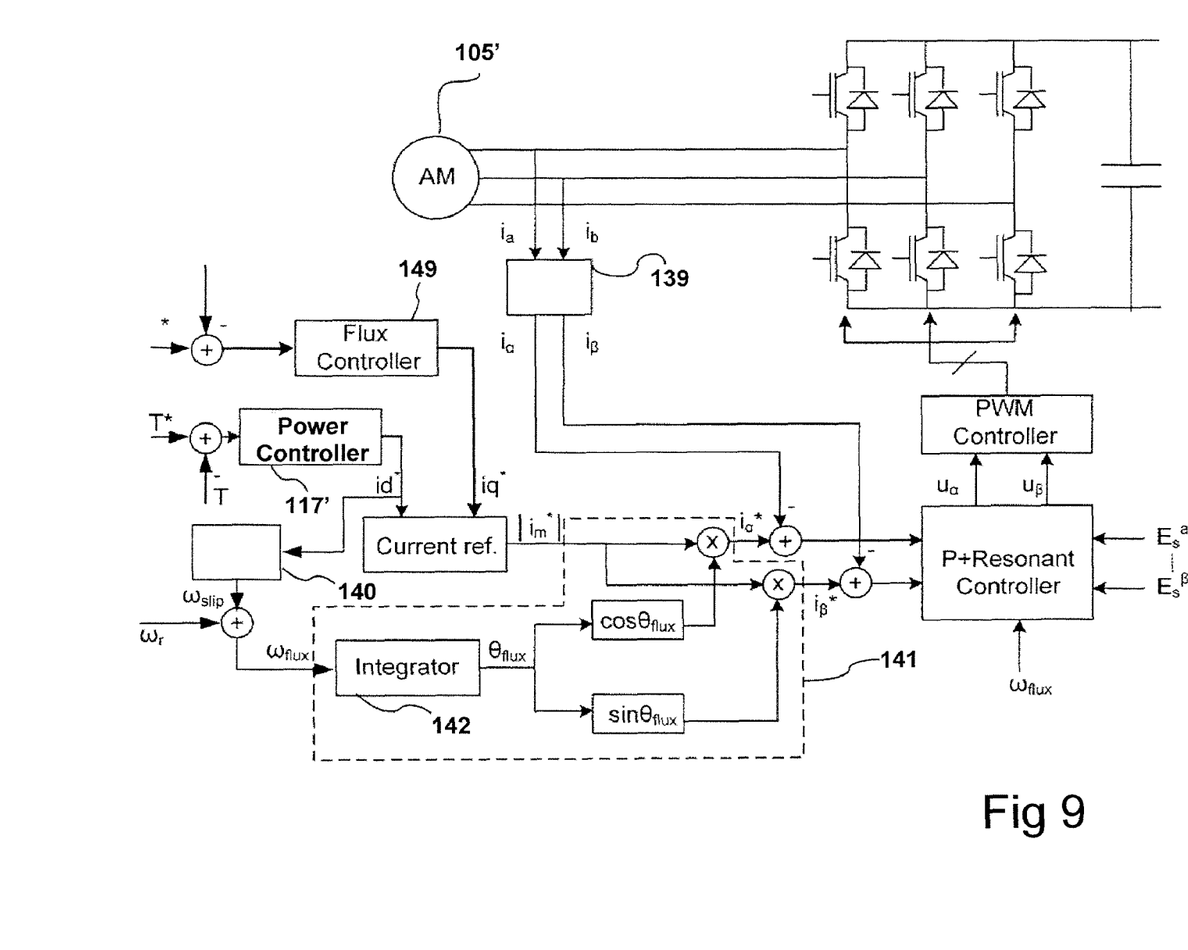
FIG. 9 illustrates a controller for an asynchronous machine according to one embodiment of the invention.

Adaptation to asynchronous machines, AMs, such as squirrel cage generators may be carried out according to one embodiment of the invention with reference to FIG. 9. In order to control the machine, the rotation speed of the actual rotor flux must be determined, and with an AM generator, there is always a slip $\omega_{slip}$ between the rotor and the rotor flux, as long as electric energy is produced. The actual rotation speed of the rotor flux $\omega_{flux}$ is therefore:

$$\omega_{flux} = \omega_r + \omega_{slip}$$

(Eq. 19)

where $\omega_{slip}$ is the speed of the rotor slip and $\omega_r$ is the speed of the rotor. The slip is directly connected to the produced torque T. The slip speed, which is negative compared to the rotor speed, may be determined as:

$$\omega_{slip} = \frac{|i_d^*| \times R_r \times L_m}{\Psi^* \times L_r}$$

(Eq. 20)

where $R_r$ is the rotor resistance, $L_m$ is the magnetizing inductance $\psi^*$ is the generator flux demand signal, $L_r$ is the rotor leakage inductance and $i_d^*$ is output of power controller. The slip may thus be determined by a function block 140 implementing Equation 20.

Alternatively, the rotor flux $\omega_{flux}$ may be determined by means of a flux observer.

Another difference of AM control compared to synchronous machine control is that the reference current magnitude is built not only by using the output of the power/torque loop. This is due to the fact that the rotor flux is not constant as is the case with a permanent magnet rotor.

An additional flux controller 149 is used for AM control. The output of the flux control loop and the output of the power/torque loop are all needed and used to build the current magnitude.

The actual rotation speed of the flux may then be calculated, and used as the input $\omega_{flux}$ to the current reference block 141 and to the P+Resonant controllers.

Figure 10:
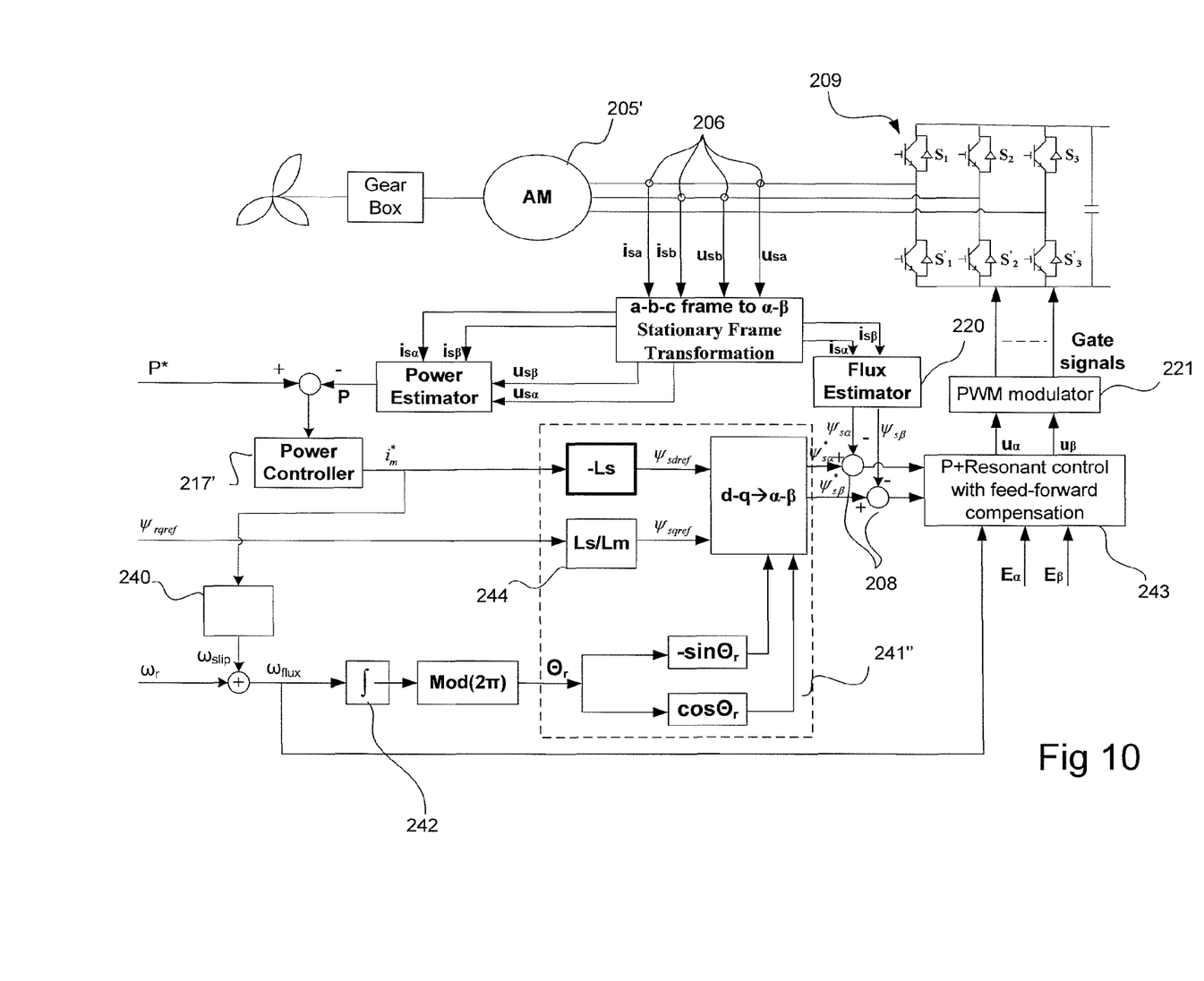
FIG. 10 illustrates a controller for an asynchronous machine according to another embodiment of the invention.

FIG. 10 illustrates a controller for an AM according to another embodiment of the invention.

The slip speed, which is obtained differently for this present embodiment, may be determined as:

$$\omega_{slip} = \frac{i_m^* \times R_r \times L_m}{\Psi^* \times L_r} \quad \text{(Eq. 21)}$$

where $R_r$ is the rotor resistance, $L_m$ is the magnetizing inductance, $\psi^*$ is the generator flux demand signal, $L_r$ is the rotor leakage inductance and $i_m^*$ is output of power controller. The slip may then be determined by a slip determination block 240 implementing Equation 21.

Alternatively, the rotor flux $\omega_{flux}$ may be determined by means of a flux observer.

The actual rotational speed of the flux may then be calculated, and used as the input $\omega_{flux}$ to the flux reference block 241" and to the P+Resonant controller.

Another difference of AM control as compared with synchronous machine control is the inclusion of a fixed rotor flux rating reference $\Psi_{rqref}$ as a parameter into the stator flux reference generation block.

The rotor flux rating reference $\Psi_{rqref}$ is first passed through an inductance gain block 244, which is defined as Ls/Lm, where Ls is the stator inductance, and Lm is the mutual inductance, in order to obtain the stator flux reference in the q-axis $\Psi_{sqref}$, which can be defined as:

$$\psi_{sqref} = \frac{L_s}{L_m} * \left\{ \psi_{rqref} + \lambda \tau_r * \frac{d\psi_{rqref}}{dt} \right\} \approx \frac{L_s}{L_m} * \psi_{rqref} \quad \text{(Eq. 21)}$$

The torque error $T_e$ is obtained when the actual power P is subtracted from the desired power P*. It is then passed through a PI controller to obtain the power generation current reference in the d-axle $i_m^*$. This current reference is passed through a gain block, which is defined as $-L_s$, in order to obtain the stator flux reference in the d-axle $\Psi_{rqref}$.

Thereafter, and similar to the control in a synchronous machine, a further transformation from the stator flux reference values in the d-q rotating frame to the α-β stationary frame is then performed, with consideration to the rotor flux angle $\theta_r$, to obtain the stator flux reference values in the α-β stationary frame Coming back to the P+Resonant controller of the above described embodiments, it is optionally possible to further improve the operation of the generator control by introducing feedforward control of back EMF (electromotive force). Since EMF is an AC value which is not directly related to phase current or phase voltage, better performance can be achieved by using a feedforward compensation of EMF.

Figure 11:
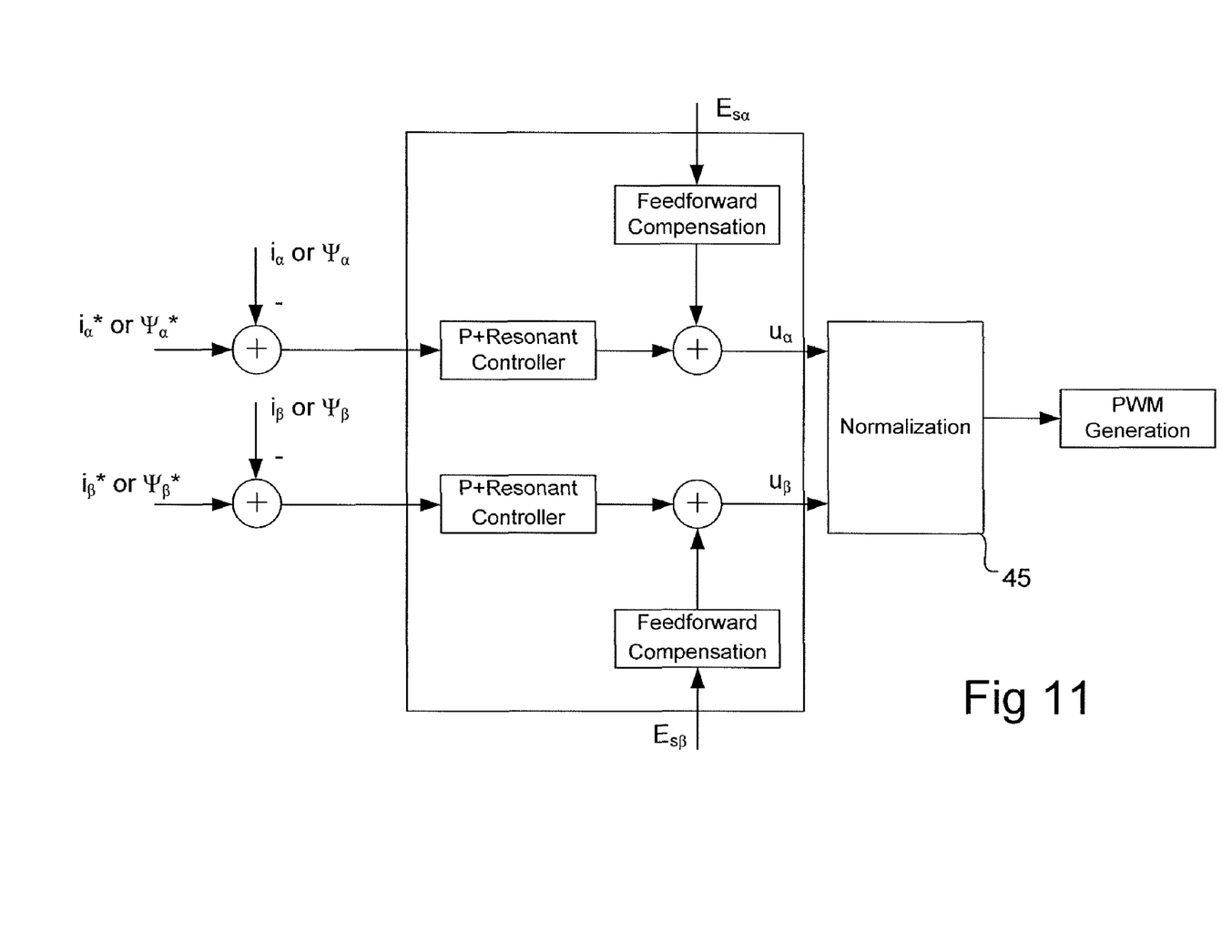
FIG. 11 illustrates optional feed-forward compensation of EMF.

The inclusion of feedforward terms in the feedback loop is shown in FIG. 11. Here, feedforward compensation of EMF in α-β stationary frame is taken as an example. The generator model in α-β stationary frame is given as (cf. Eq. 2 for natural frame):

$$\begin{bmatrix} u_{s\alpha} \\ u_{s\beta} \end{bmatrix} = \frac{d}{dt} \begin{bmatrix} \psi_{s\alpha} \\ \psi_{s\beta} \end{bmatrix} + \frac{R_s}{\left(\frac{3}{2} + \sigma\right)L_m} \begin{bmatrix} \psi_{s\alpha} \\ \psi_{s\beta} \end{bmatrix} + \begin{bmatrix} E_{s\alpha} \\ E_{s\beta} \end{bmatrix} \quad \text{(Eq. 22)}$$

The control input includes three parts as below:

$$\begin{bmatrix} u_{s\alpha} \\ u_{s\beta} \end{bmatrix} = \begin{bmatrix} u_{s\alpha\_ff} \\ u_{s\beta\_ff} \end{bmatrix} + \begin{bmatrix} u_{s\alpha\_fb} \\ u_{s\beta\_fb} \end{bmatrix} + \begin{bmatrix} u_{s\alpha\_resonant} \\ u_{s\beta\_resonant} \end{bmatrix} \quad \text{(Eq. 23)}$$

Here, control inputs $u_{s\alpha\_ff}$ and $u_{s\beta\_ff}$ denote feed-forward effort, control inputs $u_{s\alpha\_fb}$ and $u_{s\beta\_fb}$ denote feedback control effort and control inputs $u_{s\alpha\_resonant}$ and $u_{s\beta\_resonant}$ denote resonant control effort. A normalization block 45 illustrated in FIG. 11 normalizes the control signals for the converter with regard to the DC link voltage.

Feed-forward control $u_{s\alpha\_ff}$ and $us_{\beta\_ff}$ are introduced to anti-counter the effect of back-EMF as follows:

$$\begin{bmatrix} u_{s\alpha\_ff} \\ u_{s\beta\_ff} \end{bmatrix} = \begin{bmatrix} E_{s\alpha} \\ E_{s\beta} \end{bmatrix}, \quad \text{(Eq. 24)}$$

where $E_{s\alpha}$ and $E_{s\beta}$ are given below:

$$E_{s\alpha} = \omega_r \Phi_m \cos\theta_r$$

$$E_{s\beta} = -_r \Phi_m \sin\theta_r, \quad \text{(Eq. 25)}$$

respectively, where $\omega_r$ denotes the rotor angular velocity, $\theta_r$ the rotor angle, and $LP_m$, the amount of magnetic flux generated by the rotor.

With the inclusion of the feedforward compensation, the model of the generator is changed into:

$$\begin{bmatrix} u_{s\alpha\_fb} \\ u_{s\beta\_fb} \end{bmatrix} + \begin{bmatrix} u_{s\alpha\_resonant} \\ u_{s\beta\_resonant} \end{bmatrix} = \left(\frac{3}{2} + \sigma\right)L_m \cdot \frac{d}{dt} \cdot \begin{bmatrix} i_{s\alpha} \\ i_{s\beta} \end{bmatrix} + R_s \cdot \begin{bmatrix} i_{s\alpha} \\ i_{s\beta} \end{bmatrix} \quad \text{(Eq. 26)}$$

or $$\begin{bmatrix} u_{s\alpha\_fb} \\ u_{s\beta\_fb} \end{bmatrix} + \begin{bmatrix} u_{s\alpha\_resonant} \\ u_{s\beta\_resonant} \end{bmatrix} = \frac{d}{dt}\begin{bmatrix} \psi_{s\alpha} \\ \psi_{s\beta} \end{bmatrix} + \frac{R_s}{\left(\frac{3}{2} + \sigma\right)L_m}\begin{bmatrix} \psi_{s\alpha} \\ \psi_{s\beta} \end{bmatrix} \quad \text{(Eq. 27)}$$

where Eq. 26 applies to a P+Resonant controller adapted for AC current control, while Eq. 27 applies to a P+Resonant controller adapted for AC flux control.

The generator model thus becomes a very simple first-order system, which can be easily controlled. Moreover, the dynamic performance of the control system is generally improved by adding the feedforward compensation.

The invention is not restricted to the above described embodiments, and may be varied and altered in different ways within the scope of the appended claims.

The invention claimed is:

1. A method for controlling a multi-phase alternating current (AC) generator which is connected to a controllable converter, the generator having a rotor with a shaft connected to at least one wind turbine blade, the method comprising:
   determining a rotational speed and a phase of a rotor flux generated by the rotor;
   determining an estimate of a stator flux;
   generating an AC stator flux reference signal based on the phase of the rotor flux;
   determining an error signal representing the difference between estimated stator flux and the AC stator flux reference signal;
   applying the error signal to a controller to generate a reference voltage, wherein the controller has a feedback function and a resonant function with a variable resonance frequency set to correspond to the frequency of the stator flux reference; and applying the reference voltage to the controllable converter.

2. The method of claim 1, wherein the AC stator flux reference signal is generated based on an error signal corresponding to a difference between a desired power and an actual power.

3. The method of claim 1, wherein the AC stator flux reference signal is generated based on an error signal corresponding to a difference between a desired torque and an actual torque.

4. The method of claim 1, the method further comprising measuring an electrical characteristic of the AC generator, and the stator flux estimate is determined based on the electrical characteristic.

5. The method of claim 1, wherein the stator flux estimate is determined by direct measurement of the stator flux.

6. The method of claim 1, wherein the stator flux reference is generated in the d-q rotating frame before being transformed to the α-β stationary frame.

7. The method of claim 1, wherein the stator flux reference is generated in the d-q rotating frame before being transformed to the a-b-c natural frame.

8. The method of claim 1, wherein a transformation to the d-q rotating frame is not carried out in any of the steps.

9. The method of claim 1, wherein the controller is a P+resonant controller comprising a proportional coefficient, $K_P$, and a resonant coefficient, $K_I$, wherein $K_P$ and $K_I$ are constants, and wherein the resonance frequency of the controller is varied in accordance with the rotor speed.

10. The method of claim 1, wherein the controller is a P+resonant controller comprising a proportional coefficient, $K_P$, and a resonant coefficient, $K_I$, wherein either or both of $K_P$ and $K_I$ are varied depending on the rotational speed of the rotor flux, and wherein the resonance frequency of the controller is varied in accordance with the rotor speed.

11. The method of claim 1, wherein the reference voltage is compensated for the generator electromagnetic force, EMF.

12. A controlling arrangement for a multi-phase alternating current (AC) generator, comprising a rotor connected to at least one wind turbine blade, which is connected to a controllable converter, the arrangement comprising:

a first detector device for detecting a rotational speed of a rotor flux generated by the rotor;

at least one sensing device for measuring an electrical characteristic of the AC generator;

a flux estimator for determining an estimate of a stator flux based on the electrical characteristic of the AC generator;

an AC stator flux generator for generating an AC stator flux reference based on a phase of the rotor flux, the phase of the rotor flux being determined based on the rotational speed;

an error signal generator for determining an error signal representing the difference between the estimated stator flux and the AC flux reference; and a controller adapted to generate a reference voltage based on the error signal, wherein the controller has a feedback function and a resonant function with a variable resonance frequency set to correspond to the frequency of the stator flux reference, wherein the reference voltage is adapted to control the controllable converter.

13. The arrangement of claim 12, wherein the AC stator flux reference signal is generated based on an error signal corresponding to a difference between a desired power and an actual power.

14. The arrangement of claim 12, wherein the AC stator flux reference signal is generated based on an error signal corresponding to a difference between a desired torque and an actual torque.

15. The arrangement of claim 12, wherein the controller is a P+resonant controller comprising a proportional coefficient, $K_P$, and a resonant coefficient, $K_I$ wherein $K_P$ and $K_I$ are constants, and wherein the resonance frequency of the controller is varied in accordance with the rotor speed.

16. The arrangement of claim 12, wherein the controller is a P+resonant controller comprising a proportional coefficient, $K_P$, and a resonant coefficient, $K_I$ wherein either or both of $K_P$ and $K_I$ are varied depending on the rotational speed of the rotor flux, and wherein the resonance frequency of the controller is varied in accordance with the rotor speed.

17. The arrangement of claim 12, wherein the reference voltage is compensated for the generator electromagnetic force, EMF.

* * * * *